(No Model.)

E. B. GRAFF.
CAR FENDER.

No. 529,260. Patented Nov. 13, 1894.

WITNESSES:
Fred G. Dieterich
Edw. W. Byrn.

INVENTOR
Elie Beatty Graff.
BY Munn & Co.
ATTORNEYS.

UNITED STATES PATENT OFFICE.

ELIE BEATTY GRAFF, OF BALTIMORE, MARYLAND.

CAR-FENDER.

SPECIFICATION forming part of Letters Patent No. 529,260, dated November 13, 1894.

Application filed June 25, 1894. Serial No. 515,687. (No model.)

*To all whom it may concern:*

Be it known that I, ELIE BEATTY GRAFF, of Baltimore city, in the State of Maryland, have invented a new and useful Improvement in Car-Fenders, of which the following is a specification.

The object of my invention is to provide an adjustable safety car fender or guard for the front ends of all kinds of rapid transit cars, for the protection of pedestrians from being killed or injured by being run over or knocked down.

My invention consists in the peculiar construction of a fender adapted to be connected to either end of the car and having cushions, springs, and a receiving bed, as will be hereinafter more fully described.

Figure 1:
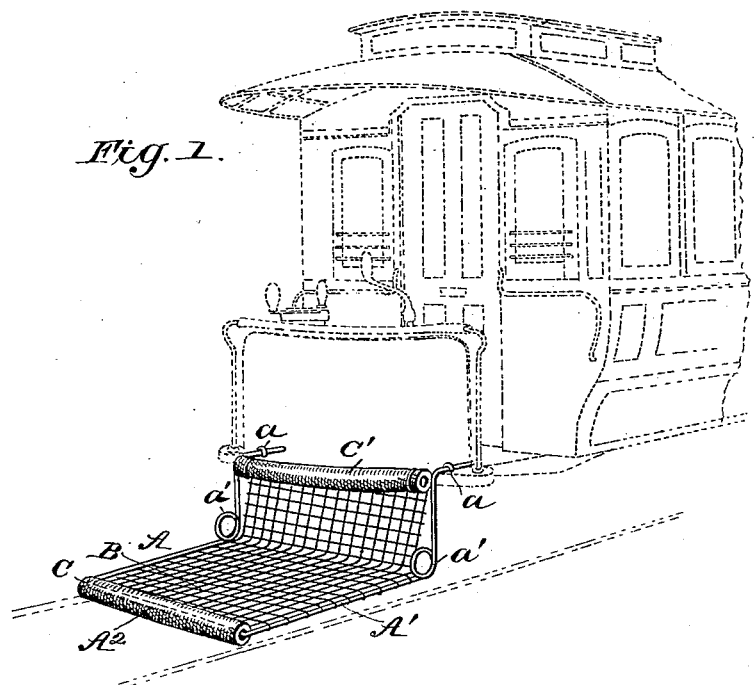
Figure 2:
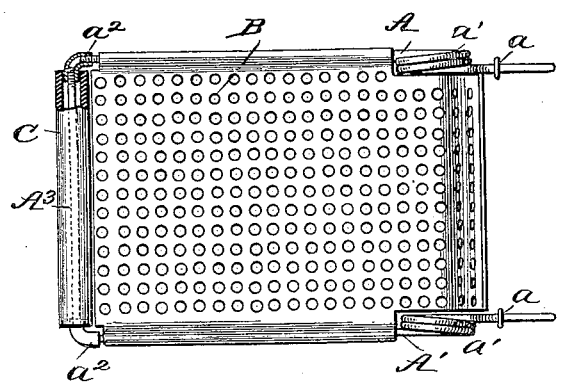

Figure 1 is a perspective view in dotted lines of the front end of a car having my fender attached, and Fig. 2 is a plan view of a modified form of the fender.

In the drawings A and A' are the two main frame bars of the fender. Each of these has its upper end in a horizontal position and detachably secured to the frame work or body of the car by staples $a$, or by screws, bolts, or other well known form of detachable connections. These bars are from their point of connection with the car bent downward in nearly a vertical position, and at a short distance above the road bed are coiled into one or more convolutions $a'$ to form a strong coil-spring, and are thence extended horizontally a distance of about three feet more or less in front of the car.

The two frame bars A A' may be made in one piece of spring steel or other metal bent to form a loop or cross bar $A^3$ in front which is continuous with the side bars, as in Fig. 1, or they may be separate bars connected to a separate cross bar $A^3$ in front by means of elbows or angle couplings $a^2$ as shown in Fig. 2. The coil springs $a'$ may also have one or more convolutions as may be desired.

The bed of the fender is composed of a sheet of heavy woven wire B, or perforated metal, or it may be made of wood, lattice work, rattan, leather, or fabric. It is fastened between the side bars and conforms in shape to the same so as to form a horizontal bed or shelf with a raised rear wall.

To break the violence of the impact of the fender against the person, it is provided along its front edge with a hollow cushion C of soft rubber or other elastic material, and a second cushion C' of similar construction is attached to the rear upturned edge to prevent contact of the person against the hard and unyielding parts of the car frame.

The action of this fender is as follows: Whenever a person is struck by it the fender yields rearwardly, the spring coils $a'$ of the side bars permitting this, and also allowing the front edge of the fender to press closely down to the road bed so as to surely scoop up the person. This not only avoids injury to the person from the impact, but also certainly scoops up the body without mangling or injuring the same, and safely carries it along on the flexible bed until the car is stopped.

In distinguishing my invention from other preceding inventions bearing some resemblance to the same, I would state that I am aware a car fender has been heretofore constructed with a vertical portion extending downwardly from the car to a point near the track, and then extended horizontally and forwardly, both in the form of rigid bars, and also of bars jointed together at the angle between the vertical and horizontal sections. I am also aware that these jointed sections have been connected by springs, and that side bars having a coiled spring at their upper ends made of a convolution of the side bars and extending downwardly is also not new, and I therefore limit my invention to the fender having side bars with their vertical portions and their horizontal portions made in one piece and with one or more spring convolutions formed at the lower end of the vertical portion, and at the rear end of the horizontal portion, so as to occupy a position in the angle between the said vertical and horizontal portions. This special construction secures the following result: It not only holds the horizontal portion in a stiff but elastic manner, but the convolutions form springs that open or expand downwardly and allow the front end of the horizontal portion to bend downwardly by the impact of the object when the latter is struck, and, by pressing more closely to the track underneath the object, serves to more surely scoop up the object, instead of sliding over it as in most other elastic constructions.

Having thus described my invention, what I claim as new, and desire to secure by Letters Patent, is—

1. A car fender composed of a frame work having two side bars each made in one piece, one portion of each side bar being bent to a vertical position, and the other portion to a horizontal position, the vertical portion having its lower end connected to and continuous with the rear end of the horizontal portion and coiled at this point into one or more elastic convolutions to form springs, substantially as and for the purpose described.

2. A car fender composed of a frame work having two side bars each made in one piece, one portion of each side bar being bent to a vertical position, and the other portion to a horizontal position, the vertical portion having its lower end connected to and continuous with the rear end of the horizontal portion and coiled at this point into one or more convolutions to form springs, a cross bar at the front end of the horizontal portion provided with a hollow elastic cushion, and another hollow elastic cushion arranged at the top of the vertical portion substantially as shown and described.

ELIE BEATTY GRAFF.

Witnesses:
ARTHUR M. EASTER,
WILLIAM W. ROLLINS.